US011948443B2

(12) United States Patent
Ten Kate et al.

(10) Patent No.: US 11,948,443 B2
(45) Date of Patent: Apr. 2, 2024

(54) METHOD AND APPARATUS FOR DETECTING A FALL BY A USER

(71) Applicant: Lifeline Systems Company, Framingham, MA (US)

(72) Inventors: Warner Rudolph Theophile Ten Kate, Waalre (NL); Ronaldus Maria Aarts, Geldrop (NL); Mark Thomas Johnson, Arendonk (BE); Patrick Kechichian, Eindhoven (NL)

(73) Assignee: Lifeline Systems Company, Framingham, MA (US)

( * ) Notice: Subject to any disclaimer, the term of this patent is extended or adjusted under 35 U.S.C. 154(b) by 174 days.

(21) Appl. No.: 17/447,371

(22) Filed: Sep. 10, 2021

(65) Prior Publication Data

US 2021/0407274 A1 Dec. 30, 2021

Related U.S. Application Data

(63) Continuation of application No. 16/977,833, filed as application No. PCT/EP2019/055232 on Mar. 4, 2019, now Pat. No. 11,127,275.

(30) Foreign Application Priority Data

Mar. 9, 2018 (EP) .................................... 18160856

(51) Int. Cl.
*G08B 21/04* (2006.01)
*G08B 29/18* (2006.01)

(52) U.S. Cl.
CPC ....... *G08B 21/043* (2013.01); *G08B 21/0446* (2013.01); *G08B 29/185* (2013.01)

(58) Field of Classification Search
CPC . G08B 21/043; G08B 21/0446; G08B 29/185
See application file for complete search history.

(56) References Cited

U.S. PATENT DOCUMENTS

| | | | | |
|---|---|---|---|---|
| 8,115,641 | B1 | 2/2012 | Dempsey | |
| 9,551,804 | B1 * | 1/2017 | Kechichian | A61B 5/1117 |
| 9,747,774 | B1 * | 8/2017 | Sung | G08B 21/043 |
| 9,998,893 | B2 * | 6/2018 | Esenwein | G08B 21/043 |
| 10,198,928 | B1 * | 2/2019 | Ross | A61B 5/746 |
| 10,380,866 | B1 * | 8/2019 | Ross | G08B 21/043 |
| 11,055,981 | B1 * | 7/2021 | Kurfirst | G06N 20/00 |
| 11,100,781 | B2 * | 8/2021 | Pijl | G08B 21/043 |

(Continued)

OTHER PUBLICATIONS

International Search Report and Written Opinion of PCT/EP2019/055232, dated May 8, 2019, 15 pages.

*Primary Examiner* — Curtis J King
(74) *Attorney, Agent, or Firm* — Honigman LLP

(57) ABSTRACT

According to an aspect, there is provided a fall detection apparatus for detecting a fall by a user, the fall detection apparatus comprising a processing unit configured to: receive measurements of movements of the user over time from a first movement sensor that is to be worn or carried by the user, determine if any of one or more objects are being carried or used by the user, and determine whether the user has fallen by processing the received measurements of the movements of the user and measurements of movements of any object that is being carried or used by the user.

20 Claims, 5 Drawing Sheets

(56) References Cited

U.S. PATENT DOCUMENTS

| | | | | |
|---|---|---|---|---|
| 2007/0159332 | A1* | 7/2007 | Koblasz | A61B 5/411 340/572.1 |
| 2011/0281550 | A1* | 11/2011 | Peabody | G08B 25/001 455/404.2 |
| 2013/0054180 | A1 | 2/2013 | Barfield | |
| 2013/0143519 | A1* | 6/2013 | Doezema | A61B 5/681 455/404.2 |
| 2014/0276242 | A1 | 9/2014 | Chen et al. | |
| 2014/0338445 | A1 | 11/2014 | Lin et al. | |
| 2015/0269824 | A1* | 9/2015 | Zhang | A61B 5/746 340/539.12 |
| 2015/0379851 | A1 | 12/2015 | Diels | |
| 2016/0140827 | A1* | 5/2016 | Derenne | A61B 5/6892 340/573.7 |
| 2016/0203692 | A1 | 7/2016 | Ten Kate et al. | |
| 2017/0109990 | A1* | 4/2017 | Xu | G08B 21/0446 |
| 2017/0172462 | A1 | 6/2017 | Alghazi | |
| 2017/0188895 | A1 | 7/2017 | Nathan | |
| 2017/0200359 | A1* | 7/2017 | Gregg | H04L 67/535 |
| 2017/0209077 | A1* | 7/2017 | Chang | A61B 5/746 |
| 2017/0332907 | A1* | 11/2017 | Liang | G16Z 99/00 |
| 2018/0228405 | A1* | 8/2018 | Burwinkle | G16H 40/60 |
| 2019/0051144 | A1* | 2/2019 | David | G08B 21/0415 |
| 2019/0197861 | A1 | 6/2019 | Tunnell | |
| 2019/0228633 | A1* | 7/2019 | Tobiassen | G08B 21/0446 |
| 2020/0105116 | A1* | 4/2020 | Jang | G08B 21/0453 |
| 2020/0146550 | A1* | 5/2020 | Tunnell | H04L 65/4015 |
| 2020/0205746 | A1* | 7/2020 | Burwinkel | G08B 21/0446 |
| 2020/0219372 | A1 | 7/2020 | Kwatra et al. | |
| 2020/0320851 | A1* | 10/2020 | Deutsch | G08B 25/10 |
| 2020/0342737 | A1* | 10/2020 | Pham | A61B 5/0205 |
| 2020/0378758 | A1* | 12/2020 | Yang | A61B 5/024 |
| 2021/0056828 | A1* | 2/2021 | Ten Kate | G08B 21/0446 |
| 2022/0248970 | A1* | 8/2022 | Burwinkel | G08B 29/188 |
| 2022/0260422 | A1* | 8/2022 | Brillaud | G08B 21/0469 |

* cited by examiner

METHOD AND APPARATUS FOR DETECTING A FALL BY A USER

CROSS REFERENCE TO PRIOR APPLICATIONS

This U.S. patent application is a continuation of, and claims priority under 35 U.S.C. § 120 from, U.S. patent application Ser. No. 16/977,833, filed on Sep. 3, 2020, which is a U.S. National Phase application under 35 U.S.C. § 371 of International Application No. PCT/EP2019/055232, filed on Mar. 4, 2019, which claims the benefit of European Patent Application 18160856.3, filed on Mar. 9, 2018. The disclosures of these prior applications are considered part of the disclosure of this application and are hereby incorporated by reference in their entireties.

TECHNICAL FIELD

The invention relates to a method and apparatus for detecting a fall by a user.

BACKGROUND

Falls of individuals are a significant problem, particularly for elderly people.

About 30 percent of people over 65 years old fall at least once a year. A fall is defined as a sudden, uncontrolled and unintentional downward displacement of the body to the ground, followed by an impact, after which the body stays down on the ground. A fall may cause injury and lead to reduced mobility and difficulty in maintaining independence.

PERS (personal emergency response system) is a system for users in which help can be assured. By means of Personal Help Buttons (PHBs), the user can push the button to summon help in an emergency. A majority of calls are because the user has fallen. However, if the user suffers a severe fall (for example by which they get confused or even worse if they are knocked unconscious), the user might be unable to push the PHB, which might mean that help doesn't arrive for a significant period of time, particularly if the user lives alone. The consequences of a fall can become more severe if the user stays lying for a long time.

Fall detection systems are also available that process the output of one or more movement sensors and/or air pressure sensors to determine if the user has suffered a fall, thereby allowing an alert to be generated without the need of pushing the PHB. Most existing body-worn fall detection systems make use of an accelerometer (usually an accelerometer that measures acceleration in three dimensions) and they are configured to infer the occurrence of a fall by processing the time series generated by the accelerometer. An air pressure sensor can provide a measure of a height (altitude) change, for example due to a fall. A fall detector that is part of a PHB/PERS device can take a plurality of form factors, for instance be in the form of a pendant that is worn around the neck, or in the form of a watch, band or bracelet that is worn at the wrist.

Fall detection systems are typically optimized to trade the false alarm (FA) rate against the fall detection probability. That is, a fall detector aims to detect the occurrence of falls as accurately as possible (i.e. positively detecting every instance of a fall), while minimizing the number of false detections (i.e. detecting a fall when no fall has taken place). The location of the body at which the fall detector is worn can affect the FA rate. For example, where the fall detector is worn at suboptimal locations like the wrist, the FA rate can be higher. The FA rate may also increase when the fall detection algorithm is configured to detect more exceptional (or more unusual) fall situations, such as, for example, falling on to the bed when trying to get up out of bed or falling when bending down to pick something up from the floor.

It is a drawback of current fall detection system or apparatus that the false alarm rate is too high, thereby generating an avoidable data flow, an increased burden on the healthcare system, and an episode of stress for the wearer, which could have adverse health effect. There is therefore a desire to further improve the false alarm rate of fall detectors while maintaining, or even improving, the probability of successfully detecting a fall.

SUMMARY

The techniques described herein make use of the increasing occurrence of sensors in connected devices used in the home, work or healthcare environment (the so-called 'Internet of Things' (TOT)). A user may use one or more of these connected devices from time to time, and the information obtained by the sensor(s) in those devices may be useful in detecting whether a user has suffered a fall. For example, a sensor or sensors may be present in an assistive device, such as a walking stick or walking frame, or a smart phone, and if the user falls while using or carrying one of these devices, analyzing or processing the sensor measurements relating to the device in conjunction with processing of measurements of movements by a fall detector may provide more reliable detection of whether the subject has incurred a fall.

Thus, according to a first specific aspect, there is provided a fall detection apparatus for detecting a fall by a user, the fall detection apparatus comprising a processing unit configured to: receive measurements of movements of the user over time from a first movement sensor that is to be worn or carried by the user; determine if any of one or more objects are being carried or used by the user; and determine whether the user has fallen by processing the received measurements of the movements of the user and measurements of movements of any object that is being carried or used by the user. Thus, the reliability of fall detection of the user by a system or an apparatus can be improved by making use of movement measurements of any object that is being carried or used by the user.

In some embodiments, the processing unit is configured to determine whether the user has fallen by processing only the received measurements of the movements of the user if it is determined that none of the one or more objects are being carried or used by the user. In this way, if no objects are being carried or used by the user (or no objects are being carried or used that can improve fall detection reliability), then the apparatus operates to detect a fall in a conventional yet effective way.

In some embodiments, the processing unit is configured to analyze the received measurements of movements of the user to determine an initial indication of whether the user may have fallen; and determine if any of the one or more objects are being carried or used by the user if the initial indication indicates that the user may have fallen. In this way, the processing of additional sets of movement measurements can be prevented until a possible fall is detected from the measurements of the movements of the user, thereby reducing power/resource consumption, while keeping reliability of the measurement.

In some embodiments, the processing unit is configured to determine whether the user has fallen by: processing the received measurements of the movements of the user to determine a first indication of whether the user has fallen; for each object that has been determined to be carried or used by the user, process respective measurements of the movements of the object to determine a respective indication of whether the user or object has fallen; and determine whether the user has fallen based on the first indication and the respective indication for each object that has been determined to be carried or used by the user. In this way, each of the user and the object(s) can be separately assessed for a fall, and an overall fall outcome determined from those separate assessments.

In alternative embodiments, the processing unit is configured to determine whether the user has fallen by: processing the received measurements of the movements of the user to extract values for one or more fall characteristics; for each object that has been determined to be carried or used by the user, process respective measurements of the movements of the object to extract values for one or more fall characteristics; and determine whether the user has fallen based on the values of the one or more fall characteristics extracted from the received measurements of the movements of the user and the values of the one or more fall characteristics extracted from the respective measurements of the movements of the objects. In this way, fall characteristics for the user and the object(s) can be combined to determine whether a fall has occurred.

In some embodiments, the one or more fall characteristics comprises any of a height change, a vertical velocity, the occurrence of an impact, an impact magnitude, a period of free fall, an amount of rotation or orientation change and a motionless period after an impact.

In some embodiments, the processing unit is configured to determine if any of the one or more objects are being carried or used by the user based on any one or more of: measurements of the movements of one or more of the objects; indications of whether any of the one or more objects is switched on or activated; measurements of the location of the one or more objects; indications of whether any of the one or more objects are wirelessly connected to the fall detection apparatus; measurements of temperature at one or more of the objects; and measurements of air pressure at one or more of the objects.

In alternative embodiments, the processing unit is configured to determine if any of the one or more objects are being carried or used by the user by comparing the received measurements of the movements of the user with measurements of the movements of the one or more objects. This comparison of the movements of the user and object can provide a reliable indication of whether an object is being carried or used by the user. In these embodiments the processing unit can be configured to compare the received measurements of the movements of the user with respective measurements of the movements of the one or more objects to determine if any of the one or more objects are being carried or used by the user by: determining a measure of activity of the user from the received measurements of the movements of the user; for each object, determining a measure of activity of the object from the respective measurements of the movements of the object; and for each object, comparing the measure of activity of the user to the measure of activity of the object to determine if the object is being carried or used by the user. In these embodiments, the processing unit can be configured to compare the measure of activity of the user to the measure of activity of the object to determine a measure of correlation between the activity of the user and the activity of the object, and to determine whether an object is being carried or used by the user based on the measure of correlation.

In some embodiments, the processing unit is further configured to: receive measurements of air pressure over time from a first air pressure sensor that is to be worn or carried by the user; receive respective measurements of air pressure over time from respective air pressure sensors that are for monitoring the air pressure at the one or more objects; determining if there is a correlation between the measurements of air pressure at the user with the respective measurements of the air pressure at the one or more objects; and using the result of the correlation to determine if any of the one or more objects are being carried or used by the user. In this way it is possible to determine if the object and user are in the same environment, e.g. in the same room, outside, on the same floor of a building, etc.

In some embodiments, the processing unit is further configured to determine if a detected fall is an exception due to the dropping of an object that is being carried or used by the user. In this way, accidental drops of an object (or an object otherwise falling on the floor) will not lead to a fall of the user being detected. In these embodiments, the processing unit can be configured to determine if a detected fall is an exception by determining from respective measurements of the movements of the one or more objects whether there is a height increase following an impact. In these embodiments the processing unit can be configured to determine if a detected fall is an exception by determining from the respective measurements of the movements of the one or more objects whether there is a height increase following an impact and determining from the measurements of the movements of the user whether there is a corresponding height increase of the first movement sensor.

In some embodiments, any of the one or more objects can comprise a telephone, a smart phone, a tablet computer, a laptop computer, an activity tracker, a walking stick, a walking cane, a walking frame, assistive devices, exercise equipment, a remote control, an item of household equipment, and a personal care device (e.g. a toothbrush, a shaver, a haircare device, etc.).

In some embodiments, the first movement sensor is part of a watch, a smart watch, a pendant, a chest band, a waist band, an item of clothing or a wearable device.

In some embodiments, the processing unit is further configured to receive respective measurements of movements of the one or more objects over time from respective movement sensors that are for monitoring the movements of the one or more objects.

According to a second aspect, there is provided a fall detection system for detecting a fall by a user, the fall detection system comprising a fall detection apparatus according to the above aspect or any embodiment thereof; and one or more objects that can be carried or used by the user, each object having a respective movement sensor for measuring the movements of the object.

In some embodiments, the respective movement sensors for monitoring the movements of the one or more objects are integrated into or attached to the objects.

According to a third specific aspect, there is provided a method of detecting a fall by a user, the method comprising: receiving measurements of movements of the user over time from a first movement sensor that is worn or carried by the user; determining if any of one or more objects are being carried or used by the user; and determining whether the user has fallen by processing the received measurements of the movements of the user and measurements of movements of any object that is being carried or used by the user. Thus, the reliability of fall detection of the user can be improved by making use of movement measurements of any object that is being carried or used by the user.

In some embodiments, the method further comprises determining whether the user has fallen by processing only the received measurements of the movements of the user if it is determined that none of the one or more objects are being carried or used by the user. In this way, if no objects are being carried or used by the user (or no objects are being carried or used that can improve fall detection reliability), then the apparatus operates to detect a fall in a conventional way.

In some embodiments, the step of determining whether the user has fallen comprises analyzing the received measurements of movements of the user to determine an initial indication of whether the user may have fallen; and determining if any of the one or more objects are being carried or used by the user if the initial indication indicates that the user may have fallen. In this way, the processing of additional sets of movement measurements can be prevented until a possible fall is detected from the measurements of the movements of the user, thereby reducing power/resource consumption.

In some embodiments, the step of determining whether the user has fallen comprises processing the received measurements of the movements of the user to determine a first indication of whether the user has fallen; for each object that has been determined to be carried or used by the user, processing respective measurements of the movements of the object to determine a respective indication of whether the user or object has fallen; and determining whether the user has fallen based on the first indication and the respective indication for each object that has been determined to be carried or used by the user. In this way, each of the user and the object(s) can be separately assessed for a fall, and an overall fall outcome determined from those separate assessments.

In alternative embodiments, the step of determining whether the user has fallen comprises processing the received measurements of the movements of the user to extract values for one or more fall characteristics; for each object that has been determined to be carried or used by the user, processing respective measurements of the movements of the object to extract values for one or more fall characteristics; and determining whether the user has fallen based on the values of the one or more fall characteristics extracted from the received measurements of the movements of the user and the values of the one or more fall characteristics extracted from the respective measurements of the movements of the objects. In this way, fall characteristics for the user and the object(s) can be combined to determine whether a fall has occurred.

In some embodiments, the one or more fall characteristics comprises any of a height change, a vertical velocity, the occurrence of an impact, an impact magnitude, a period of free fall, an amount of rotation or orientation change and a motionless period after an impact.

In some embodiments, the step of determining if any of the one or more objects are being carried or used by the user makes use of any one or more of: measurements of the movements of one or more of the objects; indications of whether any of the one or more objects is switched on or activated; measurements of the location of the one or more objects; indications of whether any of the one or more objects are wirelessly connected to the fall detection apparatus; measurements of temperature at one or more of the objects; and measurements of air pressure at one or more of the objects.

In alternative embodiments, the step of determining if any of the one or more objects are being carried or used by the user comprises comparing the received measurements of the movements of the user with measurements of the movements of the one or more objects. This comparison of the movements of the user and object can provide a reliable indication of whether an object is being carried or used by the user. In these embodiments the step of comparing the received measurements of the movements of the user with respective measurements of the movements of the one or more objects to determine if any of the one or more objects are being carried or used by the user comprises determining a measure of activity of the user from the received measurements of the movements of the user; for each object, determining a measure of activity of the object from the respective measurements of the movements of the object; and for each object, comparing the measure of activity of the user to the measure of activity of the object to determine if the object is being carried or used by the user. In these embodiments, the step of comparing the measure of activity of the user to the measure of activity of the object to determine if the object is being carried or used by the user comprises comparing the measure of activity of the user to the measure of activity of the object to determine a measure of correlation between the activity of the user and the activity of the object, and determining whether an object is being carried or used by the user based on the measure of correlation.

In some embodiments, the method further comprises the steps of: receiving measurements of air pressure over time from a first air pressure sensor that is to be worn or carried by the user; receiving respective measurements of air pressure over time from respective air pressure sensors that are for monitoring the air pressure at the one or more objects; determining if there is a correlation between the measurements of air pressure at the user with the respective measurements of the air pressure at the one or more objects; and using the result of the correlation to determine if any of the one or more objects are being carried or used by the user. In this way it is possible to determine if the object and user are in the same environment, e.g. in the same room, outside, on the same floor of a building, etc.

In some embodiments, the method further comprises the step of determining if a detected fall is an exception due to the dropping of an object that is being carried or used by the user. In this way, accidental drops of an object (or an object otherwise falling on the floor) will not lead to a fall of the user being detected. In these embodiments, the step of determining if a detected fall is an exception can comprise determining from respective measurements of the movements of the one or more objects whether there is a height increase following an impact. In these embodiments the step of determining if a detected fall is an exception can comprise determining from the respective measurements of the movements of the one or more objects whether there is a height increase following an impact and determining from the measurements of the movements of the user whether there is a corresponding height increase of the first movement sensor.

In some embodiments, any of the one or more objects can comprise a telephone, a smart phone, a tablet computer, a laptop computer, an activity tracker, a walking stick, a walking cane, a walking frame, assistive devices, exercise equipment, a remote control, an item of household equipment, and a personal care device.

In some embodiments, the first movement sensor is part of a watch, a smart watch, a pendant, a chest band, a waist band, an item of clothing or a wearable device.

In some embodiments, the method further comprises the step of receiving respective measurements of movements of the one or more objects over time from respective movement sensors that are for monitoring the movements of the one or more objects.

According to a fourth aspect, there is provided a computer program product comprising a computer readable medium having computer readable code embodied therein, the computer readable code being configured such that, on execution by a suitable computer or processor, the computer or processor is caused to perform the method according to the third aspect or any embodiment thereof, These and other aspects will be apparent from and elucidated with reference to the embodiment(s) described hereinafter.

DESCRIPTION OF DRAWINGS

Exemplary embodiments will now be described, by way of example only, with reference to the following drawings, in which.

DETAILED DESCRIPTION

Figure 1:
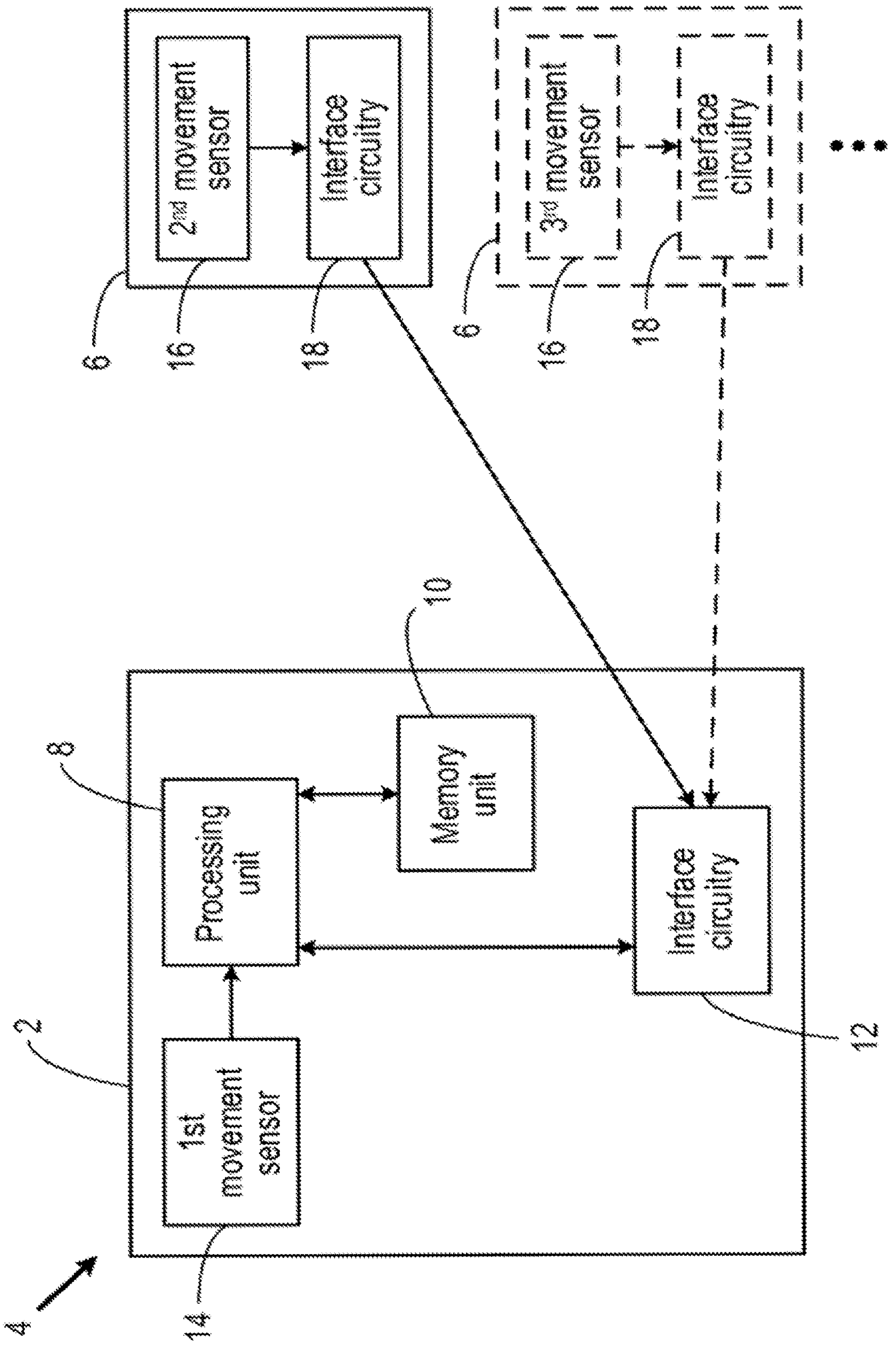
FIG. 1 is a block diagram of a fall detection apparatus according to an aspect in a fall detection system.

FIG. 1 shows a fall detection apparatus 2 according to an aspect. The fall detection apparatus 2 is shown as part of a fall detection system 4 that also includes one or more objects 6.

The fall detection apparatus 2 includes a processing unit 8 that controls the operation of the apparatus 2 and that can be configured to execute or perform the methods described herein. In particular, the processing unit 8 is provided to analyse or process measurements from one or more sensors to determine whether a user of the apparatus 2 has fallen. The processing unit 8 can be implemented in numerous ways, with software and/or hardware, to perform the various functions described herein. The processing unit 8 may comprise one or more microprocessors or digital signal processor (DSPs) that may be programmed using software or computer program code to perform the required functions and/or to control components of the processing unit 8 to effect the required functions. The processing unit 8 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 8 is connected to a memory unit 10 that can store data, information and/or signals for use by the processing unit 8 in controlling the operation of the apparatus 2 and/or in executing or performing the methods described herein. In some implementations the memory unit 10 stores computer-readable code that can be executed by the processing unit 8 so that the processing unit 8 performs one or more functions, including the methods described herein. The memory unit 10 can also store measurements or measurement signals received from one or more sensors ready for subsequent processing by the processing unit 8, and/or any other information required for or during the methods and techniques described herein. The memory unit 10 can comprise any type of non-transitory machine-readable medium, such as cache or system memory including volatile and nonvolatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

The apparatus 2 also includes interface circuitry 12 for enabling a data connection to and/or data exchange with the one or more objects 6 and/or other devices, including any one or more of servers, databases, user devices, and sensors. The connection may be direct or indirect (e.g. via the Internet), and thus the interface circuitry 12 can enable a connection between the apparatus 2 and a network, such as the Internet, via any desirable wired or wireless communication protocol. For example, the interface circuitry 12 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). The interface circuitry 12 is connected to the processing unit 8. In the event that the processing unit 8 detects a fall by the user and is to trigger an alarm or alert, the processing unit 8 may communicate the occurrence of the fall (or triggering of the alert) to a third party (e.g. a care provider or family member) via the interface circuitry 12.

The apparatus 2 further includes a movement sensor 14 that is for monitoring the movements of the apparatus 2 (and thus the movements of the user, or a part of the body of the user, when the apparatus 2 is being worn or carried by the user). The movement sensor 14 can generate a measurement signal that contains a plurality of movement measurement samples representing the movements at a plurality of time instants. The movement sensor 14 may be an accelerometer that measures accelerations, and that provides a measurement signal indicating the accelerations measured in three dimensions. The movement sensor 14 may alternatively be a gyroscope or a magnetometer. Alternatively, the fall detection apparatus 2 may include two or more movement sensors 14, with the movement sensors 14 being any combination of an accelerometer, gyroscope and magnetometer. The movement sensor 14 is connected to the processing unit 8.

It will be appreciated that although the movement sensor 14 is shown as part of the fall detection apparatus 2 in FIG. 1, the movement sensor 14 may be separate from the part of the apparatus 2 that includes the processing unit 8 (for example in a separate housing or body), and the movement sensor 14 may be connected using a wired connection or wirelessly to the rest of the apparatus 2, including the processing unit 8 (e.g. via the interface circuitry 12). For example the movement sensor 14 may be part of a smart watch, and the processing unit 8 can be part of a smart phone to which the smart watch is paired.

The apparatus 2 is a fall detector and (at least the movement sensor 14) is intended to be worn or carried by the user. Thus the fall detector apparatus 2 can be, for example, in the form of a pendant or necklace to be worn around the user's neck, in the form of a watch, bracelet or wrist band that can be worn at the wrist, in the form of a chest band or chest strap that is worn around or at the chest, in the form of a waist band or waist strap that is worn around or at the waist, in a form that can be carried in a pocket of an item of clothing, part of an item of clothing or in the form of any other type of wearable device. Alternatively, in embodiments where the movement sensor 14 is separate from the part of the apparatus 2 that includes the processing unit 8, the part of the apparatus 2 that includes the movement sensor 14 can be in a housing or body that can be worn or carried by the user (e.g. in the form of a pendant, necklace, watch, bracelet, wrist band, chest band or chest strap, etc.), and the rest of the apparatus 2 (e.g. that includes the processing unit 8) can either be in a form that can also be worn or carried by the user, or it can be in a form that is not to be carried or worn by the user. In this case, the part of the apparatus 2 that includes the processing unit 8 may be a dedicated base unit for the movement sensor 14, or it may be in the form of a computer, laptop or tablet computer.

In some embodiments, the fall detection apparatus 2 can include one or more additional sensors that can provide measurements useful for determining whether a user has fallen. For example, the fall detection apparatus 2 can include an air pressure sensor for measuring the environmental air pressure and/or changes in the environmental air pressure over time. Measurements of air pressure and/or measurements of air pressure changes can be analyzed to provide information on altitude/height or changes in altitude/height. As another example, the fall detection apparatus 2 can include one or more sensors for measuring one or more physiological characteristics of the user, such as heart rate (or other heart-related parameters), skin conductivity, etc.

It will be appreciated that a practical implementation of an apparatus 2 may include additional components to those shown in FIG. 1. For example the apparatus 2 may also include a power supply, such as a battery, or components for enabling the apparatus 2 to be connected to a mains power supply. In some embodiments, the apparatus 2 may also comprise a user interface that includes one or more components that enables a user of apparatus 2 to input information, data and/or commands into the apparatus 2, and/or enables the apparatus 2 to output information or data to the user of the apparatus 2. The user interface can comprise any suitable input component(s), including but not limited to a keyboard, keypad, one or more buttons, switches or dials, a mouse, a track pad, a touchscreen, a stylus, a camera, a microphone, etc., and the user interface can comprise any suitable output component(s), including but not limited to a display screen, one or more lights or light elements, one or more loudspeakers, a vibrating element, etc.

An object 6 that can be used in or by the fall detection system 4 can be any object that includes a sensor for measuring the movements of the object 6. The object 6 may be any type of device that can be used or carried by a user. The object 6 may therefore be any type of device used in the home, work or healthcare environment, including, but not limited to, a walking stick, a walking cane, a walking frame, a smart phone, a tablet computer, a handbag, an assistive device, any type of personal care device including a toothbrush, shaver, hair brush, etc., any type of portable kitchen appliance or implement, including a kettle, sauce pan, frying pan, mug, cup, cutlery, etc., a television remote control, any type of household equipment, including a vacuum cleaner, exercise equipment, etc. The object 6 or objects 6 can be considered as being part of the so-called Internet of Things (TOT).

Each object 6 that can be used in the system 4 includes a respective movement sensor 16 for measuring the movements of the object 6, and respective interface circuitry 18 for enabling the movement measurements or processing results derived from the movement measurements to be provided to the fall detection apparatus 2. The interface circuitry 18 may be similar in functionality to the interface circuitry 12 in the fall detection apparatus 2, and thus may be used to establish a direct connection or an indirect connection (e.g. via the Internet) to the fall detection apparatus 2 via any desirable wired or wireless communication protocol.

The movement sensor 16 may be similar to the movement sensor 14 in the fall detection apparatus 2, and thus, for example, the movement sensor 16 may be an accelerometer, gyroscope or magnetometer. In some embodiments, an object 6 may include one or more additional sensors that can be useful for fall detection, such as an air pressure sensor that measures the environmental air pressure at or around the object 6.

In some cases an object 6 may also include a processing unit (not shown in FIG. 1) that may be used as part of the control or operation of the object 6, and that may be used to perform some processing of the movement measurements to, for example, detect whether the object 6 is/has been moving, or detect whether the object 6 has suffered a fall/impact, etc. In that case, the results of that processing can be provided to the fall detection apparatus 2 by the interface circuitry 18 (in addition to or instead of the movement measurements by the movement sensor 16 in the object 6).

It will be appreciated that the movement sensor 16 and interface circuitry 18 may be integrated into an object 6 (e.g. in the case of a smartphone), or they may be part of an electronic unit that can be attached to an otherwise conventional (i.e. non-smart and/or non-10T) object 6. In a practical implementation, a fall detection system 4 may only include objects 6 that have an integrated movement sensor 16, only include objects 6 that have a separate electronic unit attached thereto, or a combination of objects 6 with an integral movement sensor 16 and objects 6 with separate electronic units.

It will also be appreciated that although FIG. 1 shows a fall detection system 4 that includes two objects 6, in practice the fall detection apparatus 2 can potentially make use of movement measurements from any number of objects 6, and so the presence of just two objects 6 in FIG. 1 should not be considered limiting.

The techniques described herein provide that the fall detection apparatus 2 determines whether any objects 6 are being carried or used by the user, and the movement measurements of any object 6 that is determined to be in use by the user or being carried by the user are analysed or processed in conjunction with processing of measurements of movements by the movement sensor 14 in the fall detector apparatus 2 to determine if the user has fallen.

One way to determine whether a particular object 6 is being carried or used by the user is by determining whether the object 6 is moving with the user. This can be determined by comparing the movement measurements of the user to the movement measurements of the object 6, or by comparing an activity pattern extracted from the measurements of the movements of the user with an activity pattern extracted from the measurements of the movements of the object 6. The actual movement signals/measurements and precise sizes of acceleration (in the case of accelerometer measurements) will be different for the user and object 6, but the general pattern of not moving, slightly moving, moderately moving, or forceful/agitated moving will exhibit some agreement between the user and object 6. Those skilled in the art will be aware of various ways in which an activity pattern can be extracted from movement measurements and ways in which movement measurements or activity patterns can be compared to determine if an object 6 is being used or carried by a user, including the use of a classifier that can be trained based on training data. For example, an activity pattern extracted from the object movement measurements can be compared or correlated with an activity pattern extracted from the user movement measurements. Movements/activities should match or correlate for a sufficient period of time (e.g. a few seconds, or a few minutes, although small interruptions can be permitted) before it can be determined that the object 6 is being used or carried by the user. In some cases if the object 6 is motionless for a period of time in which the fall detection apparatus 2/movement sensor 14 is not motionless, then it can be determined that the object 6 is not being used by the user.

Alternatively, the measurements of the movements of the object 6 can be processed independently of (i.e. without reference to) the measurements of the movements of the user to determine if the object 6 is moving in a way that is consistent with being used or carried by a user.

Another way to determine whether a particular object 6 is being carried or used by the user is to determine whether the user is gripping or holding the object 6. For example an object 6 may include pressure sensor(s) or some other form of contact/proximity sensor (such as a conductivity sensor that can detect contact with skin) on a handle or grip portion of the object 6, and the signal(s) from this/these sensors can indicate whether the object 6 is being gripped or held by a user. In a similar way, some objects 6 (e.g. a smartphone) may include a fingerprint sensor, and this sensor can provide an output indicating whether a particular user is holding, carrying or using the object 6.

Another way to determine whether a particular object 6 is being carried or used by the user is by determining whether the object 6 is activated or switched on. For example, an object 6 such as a toothbrush or a shaver will typically only be switched on when it is being used by a user, and an indication of whether the object 6 is switched on/off can be provide an indication of whether the object 6 is being used by a user.

Yet another way to determine whether an object 6 is being used or carried by the user makes use of air pressure measurements at the user and air pressure measurements at the object 6. In this case, the fall detection apparatus 2 and the object 6 should include respective air pressure sensors for measuring air pressure. The air pressure measurements from both sensors can be correlated to determine whether the object 6 is near to the user (e.g. in the same room, since air pressure can vary based on the environment, such as the room, whether a window is open, whether air conditioning is switched on, etc.).

Yet another way to determine whether an object 6 is being used or carried by the user makes use of measurements of the location of the fall detection apparatus 2/user and measurements of the location of the object 6. These measurements can be obtained using suitable sensors in the fall detection apparatus 2 and the object 6. For example the sensor can be a location sensor such as a satellite positioning system (e.g. GPS) receiver, or a wireless transceiver, such as a WiFi receiver or cellular network receiver that can use triangulation of received signals and/or the identity of detected network to determine a location. It can be determined that the object 6 is being carried or used by the user if the measurements indicate that the fall detection apparatus 2 and the object 6 arc at the same location (particularly if they share the same location with that location changing over time, i.e. as they move together).

Yet another way to determine whether an object 6 is being used or carried by the user can make use of an indication of whether the object 6 is wirelessly connected to the fall detection apparatus 2, for example via WiFi or Bluetooth, which have a limited, and relatively short, connection range.

Yet another way to determine whether an object 6 is being used or carried by the user can make use of measurements of the air temperature at the object 6. For example, if the object 6 is being carried or used by the user there may be an observable air temperature increase due to the proximity with the user or due to skin contact by the user. Alternatively, measurements of the air temperature at the object 6 can be compared with measurements of the air temperature at the fall detection apparatus 2, and if there is a correlation between the air temperature measurements, then this can indicate that the user is using or carrying the object 6.

Those skilled in the art will be aware of other ways in which it is possible to determine whether an object 6 is being used or carried by a user.

Those skilled in the art will also appreciate that any combination of the above techniques can be used to determine whether an object 6 is being used or carried by the user, and indeed a combination of the above techniques can improve the reliability of the detection of whether an object 6 is being used or carried by a user.

Since a fall detection apparatus 2 is continuously monitoring a user to determine if a fall has taken place, in some embodiments the fall detection apparatus 2 can also continuously or frequently (e.g. every few seconds) determine whether any objects 6 are being used or carried by the user so that the fall detection apparatus 2 can make use of movement measurements of any object 6 that is in use or being carried in the fall detection. In this case, the fall detection apparatus 2 can maintain a list of possible objects 6 that the user could use or carry, and this list can indicate (e.g. using a state variable for each object 6) whether the object 6 is in use or being carried by the user.

In embodiments where it is possible to identify that a particular user is holding, carrying or using the object 6 (e.g. where a fingerprint sensor provides an output indicating a particular user), the list can indicate that the object 6 is "with user" (e.g. this can be indicated using a respective state variable) provided that the object 6 continues to move (as indicated by the measurements from the movement sensor 16), regardless of whether those movements correlate with the movements measured by the movement sensor 14 in the fall detection apparatus 2). In some cases, the "with user" state can be maintained even if there are short intervals of no or little movement of the object 6.

In some embodiments, the movement measurements for any object 6 that is currently in use or being carried by the user can be processed along with the measurements of the movements of the user to determine if the user has fallen. In alternative embodiments, the movement measurements for the user can be processed to determine if a fall may have occurred, and if a fall is suspected, movement measurements for an object 6 that is in use or being carried by the user (e.g. as indicated by the state variable in the list) covering the same time period as the suspected fall can be obtained and processed with the user movement measurements to determine if the user has fallen. In either case, if no object 6 is in use or being carried by the user at a particular time, fall detection can be based just on the measurements of the movements of the user from the movement sensor 14 in the fall detection apparatus 2. Also in either case, if the list indicates that there are objects 6 being carried or used, the movement measurements for the object(s) 6 can be analyzed for a fall of the object, e.g. in the same time window as the fall detected for the user, or according to some predetermined temporal order. The fall detection outcomes for the user and object(s) 6 can then be combined to determine an overall indication of whether the user has fallen. This combination may be based on a linear combination of the fall outcomes, a weighted combination of the fall outcomes (e.g. based on the type of object 6, the reliability of the fall detection of a particular type of object), etc. Instead of combining the respective outcomes, i.e. the fall detection decisions by the fall detection apparatus 2 and every object 6 separately, another form is to combine the likelihoods of observed characteristics (e.g. impacts, free falls, height changes, orientation changes, motionless periods after an impact, etc.) by the fall detection apparatus 2 and every object 6 that is in use or being carried, and to test whether the combined likelihood exceeds a decision threshold. The observed characteristics may also include the temporal order of detected falls by the user/object(s) 6 and movement patterns. Although this approach is more complicated to implement, it can provide more accurate detection performance. In this latter approach, the presence or absence of the characteristics can be determined by the respective processing unit for the fall detection apparatus 2/object 6 as appropriate, and the characteristics for each of the fall detection apparatus 2 and object(s) 6 combined in one of the processing units. For example, in an embodiment where the fall detection apparatus 2 is in the form of a smart watch, the fall detection apparatus 2 can transmit the likelihoods of detected characteristics (or a combined likelihood, e.g. the product or sum) to an object 6 (e.g. in the form of a smart phone that the fall detection apparatus 2/smart watch is paired with), and the processing unit in the smart phone (object 6) can combine them with the likelihoods of characteristics detected in the measurements of movements by the movement sensor 16 in the smart phone.

An intermediate approach is to combine (e.g. sum) the overall (log)likelihood of every object 6 that is in use or being carried, rather than having that likelihood tested against an object-specific threshold, and apply a single decision threshold to this combined likelihood.

As another approach, the detection of a possible fall in the movement measurements for the user or an object 6 (that is in use or being carried by the user) can cause an adjustment in the fall detection algorithm applied to the other set (or sets) of movement measurements that are to be analyzed. For example, if a fall of an object 6 is detected from the object movement measurements, the fall detection threshold(s) in the algorithm used by the fall detection apparatus 2 on the user movement measurements can be relaxed to make the detection of a fall by the user more likely.

In some embodiments, the measurements of the movements of the object 6 can be analyzed or evaluated using the same fall detection algorithm used to evaluate the measurements of the movements of the user. That is, the processing of the measurements of the movements of the object 6 can aim to identify the same feature(s) (e.g. any of an impact, a height change, a free fall, a rotation and a period of no or little motion following an impact) using the same parameter(s) (e.g. impact threshold, height change threshold, etc.) as the processing of the user movements to detect a fall by the user. Alternatively, the fall detection algorithm used to evaluate the measurements of the movements of the object 6 may be optimised or adjusted based on the characteristics of the object 6 or characteristics of the object 6 when the object 6 is falling. These embodiments (i.e. the use of the same or different fall detection algorithms for the user movements and object movements) can be applied whether the processing unit 8 in the fall detection apparatus 2 evaluates both sets of movement measurements, or whether a processing unit in the respective object 6 processes the object movement measurements before providing the processing outcome (e.g. fall/no fall, or some intermediate processing products, such as impact detected/no impact, amount of height change, free fall/no free fall) to the processing unit 8 in the fall detection apparatus 2.

For example a bottom of a walking stick may slip on the ground leading to the user falling, and this slip (in addition to other fall characteristics) may be detectable in the movement measurements by the object movement sensor 16.

As another example, a height change on occurrence of a fall may have a different likelihood distribution for a user falling and an object 6 falling. The typical height change measured by a movement sensor 16 in the object 6 will be smaller than that measured by the movement sensor 14 in the fall detection apparatus 2 on the user. Another example is that the fall of a walking stick/walking cane will exhibit more of a drop/free fall than a user. In a free fall, the acceleration as sensed by an accelerometer 14/16 will vanish to zero, or close to zero, i.e. below some threshold. The transition from (around) gravity to zero will be a sharp and steep descent, as will the ascent back to gravity (−9.81 ms-2) at the end of this zero-g phase. The magnitude of the signal in this 'valley', i.e. during the zero-g phase, will be relatively flat (i.e. constant). Another characteristic of a fall by an object 6 that can be evaluated is whether the duration of the free fall (or near free-fall, e.g. where acceleration is near zero) spans a minimum length.

As yet another example, a fall detection algorithm for detecting the fall of a walking stick/cane can, in addition to or instead of detecting a free fall, evaluate the movement measurements around a detected trigger for characteristics such as an orientation change of the object 6, the (absolute) orientation of the object 6 (since, for example a walking cane will likely be lying flat), and the amount of movement after the detected trigger (typically, there will be no movement). The trigger can be, for example, detecting an impact (e.g. with a magnitude above a threshold) or detecting a height drop (e.g. with a magnitude above a threshold). Further, different signal processing algorithms to those used by the fall detection apparatus 2 on the measurements of the movements of the user may be applied to extract (quantify) the characteristics. For example, the size of the impact might be extracted in a different way, given the more free way that the object 6 may hit the ground, including the possibility that the cane may 'jump up' or bounce after hitting the ground.

It will be appreciated that a user may drop an object 6 (or the object 6 can otherwise fall onto the ground when it is not being used) without the user themselves suffering a fall. A user may typically then bend down to pick up the object 6, and this pattern of movements in the user movement measurements (e.g. height change, orientation change) and the fall present in the object movement measurements can lead to a false detection of a fall by the user. In that case, in some embodiments to avoid (or reduce the risk of) the fall of an object 6 in this way triggering an alarm that the user has fallen, before an alarm is triggered, if a fall has been detected then the fall can be tested to determine whether it relates to an exceptional situation, such as the object 6 being dropped or falling on to the floor.

Thus, after detecting a potential fall, it can be tested whether the detected fall is due to the user picking up the fallen object 6. This exceptional situation (the object falling and the user picking it up) could be detected by testing the movement measurements for a height rise shortly after the impact (of the possible fall), and the co-occurrence of this height rise (and of similar magnitudes) in both the user movement measurements and the object movement measurements.

As another example, heavy walking (i.e. walking with heavy/hard footsteps) may induce movement signals with the same feature values as a fall would do and is another type of exceptional situation. In this case, if the movement signals are periodic and of a prolonged duration, then the potential fall (perhaps identified from an impact corresponding to a heavy footstep) can be disregarded.

Figure 2:
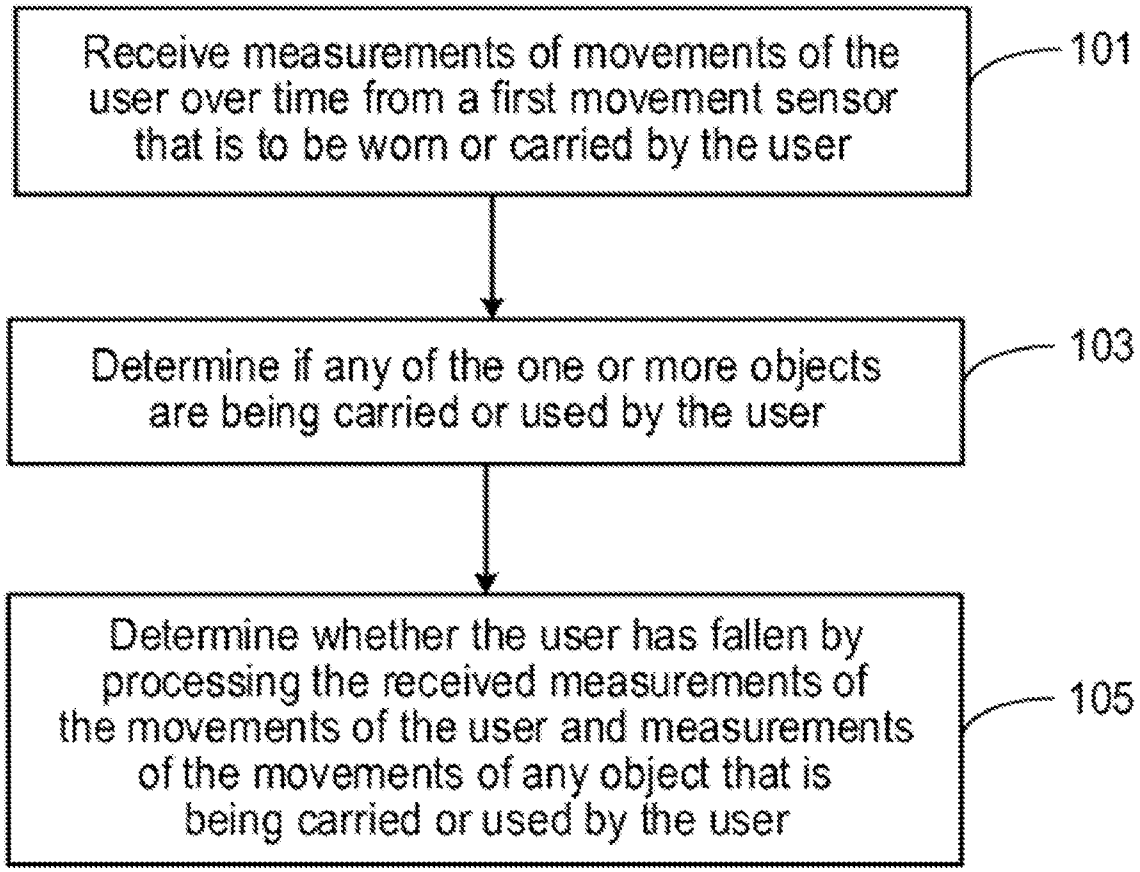
FIG. 2 is a flow chart illustrating a method of detecting a fall according to an aspect.

The flow chart in FIG. 2 illustrates a method of detecting a fall by a user according to the various techniques described herein. The method can be performed by the processing unit 8 in the fall detection device 2. In some embodiments, computer program code can be provided that causes or enables processing unit 8 to perform the method described below.

In a first step, step 101, measurements of movements of the user over time are received. These movement measurements are obtained by a movement sensor 14 that is worn or carried by the user (including a movement sensor 14 that is part of an apparatus 2 that is being worn or carried by the user). The measurements of movements may be received in real-time or near real-time, or they may have been temporarily stored in memory unit 10 and are retrieved from the memory unit 10 in step 101.

In the next step, step 103, it is determined whether any objects 6 are being carried or used by the user.

If it is determined that one or more objects 6 are being used by the user, then in step 105 the received measurements of the movements of the user and measurements of the movements of any object 6 that is being carried or used by the user are processed to determine if the user has fallen.

To perform step 105, measurements of the movements of the one or more objects 6 that are being carried or used by the user are required. These measurements of movements are obtained by respective movement sensors that monitor the movements of the one or more objects 6. Thus, in some embodiments, the method further comprises the step of receiving measurements of the movements of one or more objects 6 that have been determined to be in use or being carried by the user. In alternative embodiments, measurements of the movements of all possible objects 6 that can be used or carried by the user arc received, and the relevant set of measurements for object(s) 6 that arc determined to be in use or carried by the user are used in step 105.

If in step 103 it is determined that none of the one or more objects 6 are being carried or used by the user, then step 105 comprises determining whether the user has fallen by processing only the measurements of the movements of the user received in step 101.

In some embodiments, the method can further comprise analysing the received measurements of movements of the user to determine an initial indication of whether the user may have fallen, and step 103 may only be performed if the initial indication indicates that the user may have fallen. The initial indication could be based on whether the movement measurements contain one or more fall characteristics, such as an impact, height change, etc.

In some embodiments, step 105 comprises processing the received measurements of the movements of the user to determine a first indication of whether the user has fallen, and, for each object 6 that has been determined in step 103 to be carried or used by the user, processing respective measurements of the movements of the object 6 to determine a respective indication of whether the user or object has fallen. A decision on whether the user has fallen is then made based on the first indication and the respective indication for each object that has been determined to be carried or used by the user. The indications of whether the user or an object has fallen can be an absolute indication of a fall (i.e. the indication can indicate a fall or no fall). In a modification to this approach, a processing unit or respective processing unit associated with the object(s) 6 can process respective measurements of the movements of the object 6 to determine the respective indication of whether the user or object has fallen, and this indication can be provided to the processing unit 8 in the fall detection apparatus 2 so that the decision on whether a fall has occurred can be made.

Alternatively, step 105 can comprise processing the received measurements of the movements of the user to extract values for one or more fall characteristics, and, for each object that has been determined to be carried or used by the user, processing respective measurements of the movements of the object 6 to extract values for one or more fall characteristics. A decision on whether the user has fallen can then be made based on the values of the one or more fall characteristics extracted from the measurements of the movements of the user and the values of the one or more fall characteristics extracted from the respective measurements of the movements of the objects 6. Thus, as noted above, in some embodiments, a fall decision can be based on a combination (e.g. linear or weighted) of the values of the fall characteristics. In alternative embodiments, the values of the fall characteristics can be assessed using a classifier to determine if a fall has occurred. In a modification to this approach, a processing unit or respective processing unit associated with the object(s) 6 can process respective measurements of the movements of the object 6 to determine the values of the one or more fall characteristics for the object 6, and these values can be provided to the processing unit 8 in the fall detection apparatus 2 so that the decision on whether a fall has occurred can be made.

The fall characteristics can comprise any of a height change, a vertical velocity, the occurrence of an impact, an impact magnitude, a period of free fall, an amount of rotation or orientation change and a motionless period after an impact. In some embodiments, measurements from other types of sensors can also be analyzed to extract values for one or more other characteristics relating to a fall, such as proximity to the floor, or physiological characteristics (e.g. heart rate or skin conductivity that may indicate a stress response in the user).

Step 103 can be performed as described above, and so, for example, it is possible to determine if any objects 6 are being carried or used by the user based on any one or more of measurements of the movements of any object 6, an indication of whether any object 6 is switched on or activated; measurements of air pressure at any object; measurements of the location of the fall detection apparatus 2 and the locations of any objects 6 (or a distance between each object 6 and the fall detection apparatus 2, for example derived from locations measurements of the apparatus 2 and object 6); an indication of whether the object 6 is wirelessly connected to the fall detection apparatus 2; and measurements of the air temperature at the object 6 (optionally also measurements of the air temperature at the fall detection apparatus 2).

In some embodiments, step 103 comprises comparing the received measurements of the movements of the user with measurements of the movements of the one or more objects 6 to determine if any of the objects 6 are being carried or used by the user.

In particular, this comparison can comprise comparing a measure of activity of the user obtained from the received measurements of the movements of the user to a measure of activity of each object obtained from respective measurements of the movements of the object 6. As noted above, this comparison can determine a correlation between the user movements/user activity measure and each of the object movements/object activity measure, and identifying a particular object 6 as being in use or carried by the user if there is a sufficient correlation between the movements/activity measures. Movement/activity of an object 6 should match or correlate with movement by the user, particularly in a period of time (e.g. 10 seconds) before a possible fall event, and there should not be an absence of movement/activity by the object 6 at a time where there is movement/activity by the user.

Figure 3:
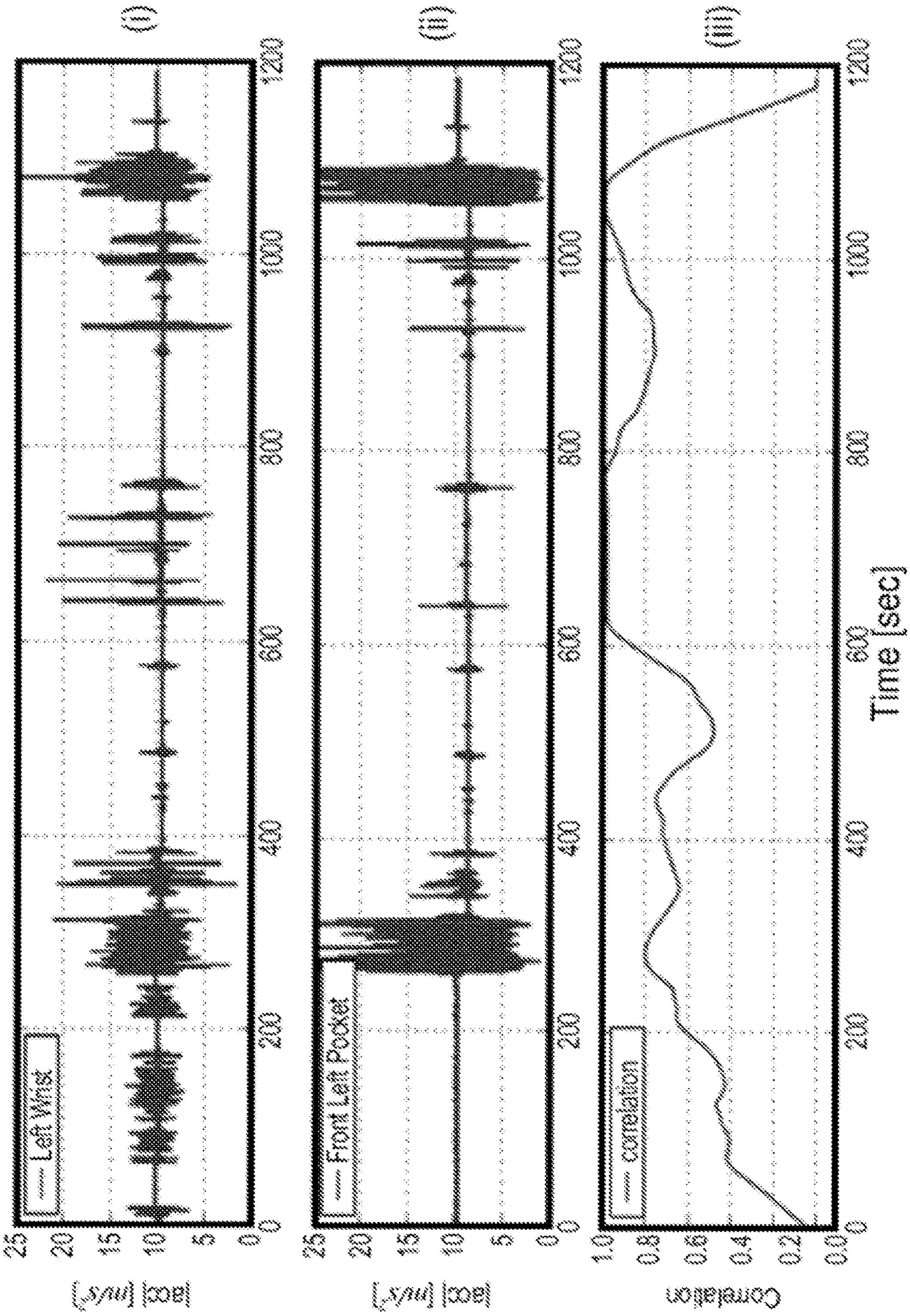
FIG. 3 shows a first set of graphs illustrating exemplary movement measurements for a fall detection apparatus, exemplary movement measurements for an object and a measure of the correlation between the movement measurements.
Figure 4:
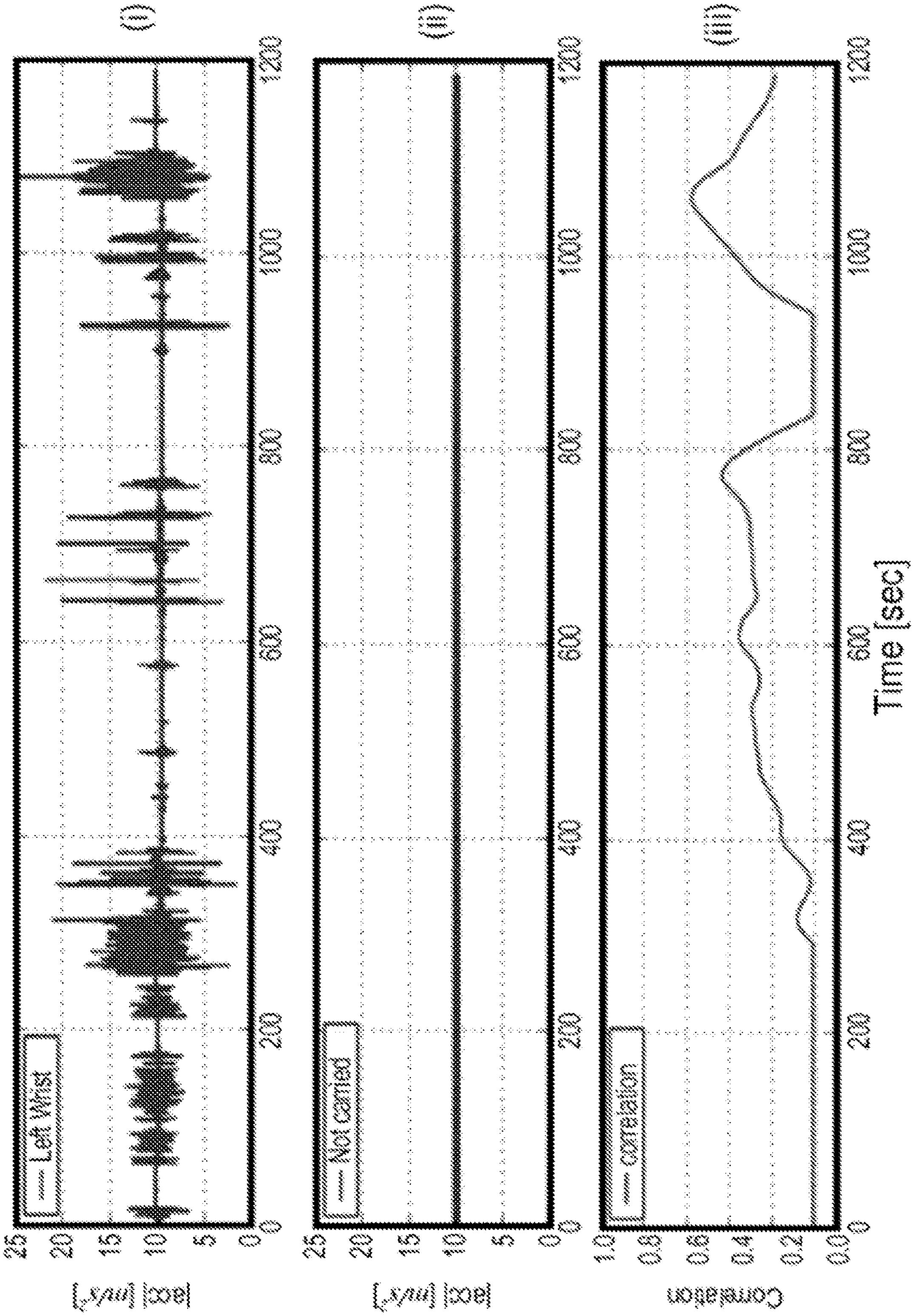
FIG. 4 shows a second set of graphs illustrating exemplary movement measurements for a fall detection apparatus, exemplary movement measurements for an object and a measure of the correlation between the movement measurements.
Figure 5:
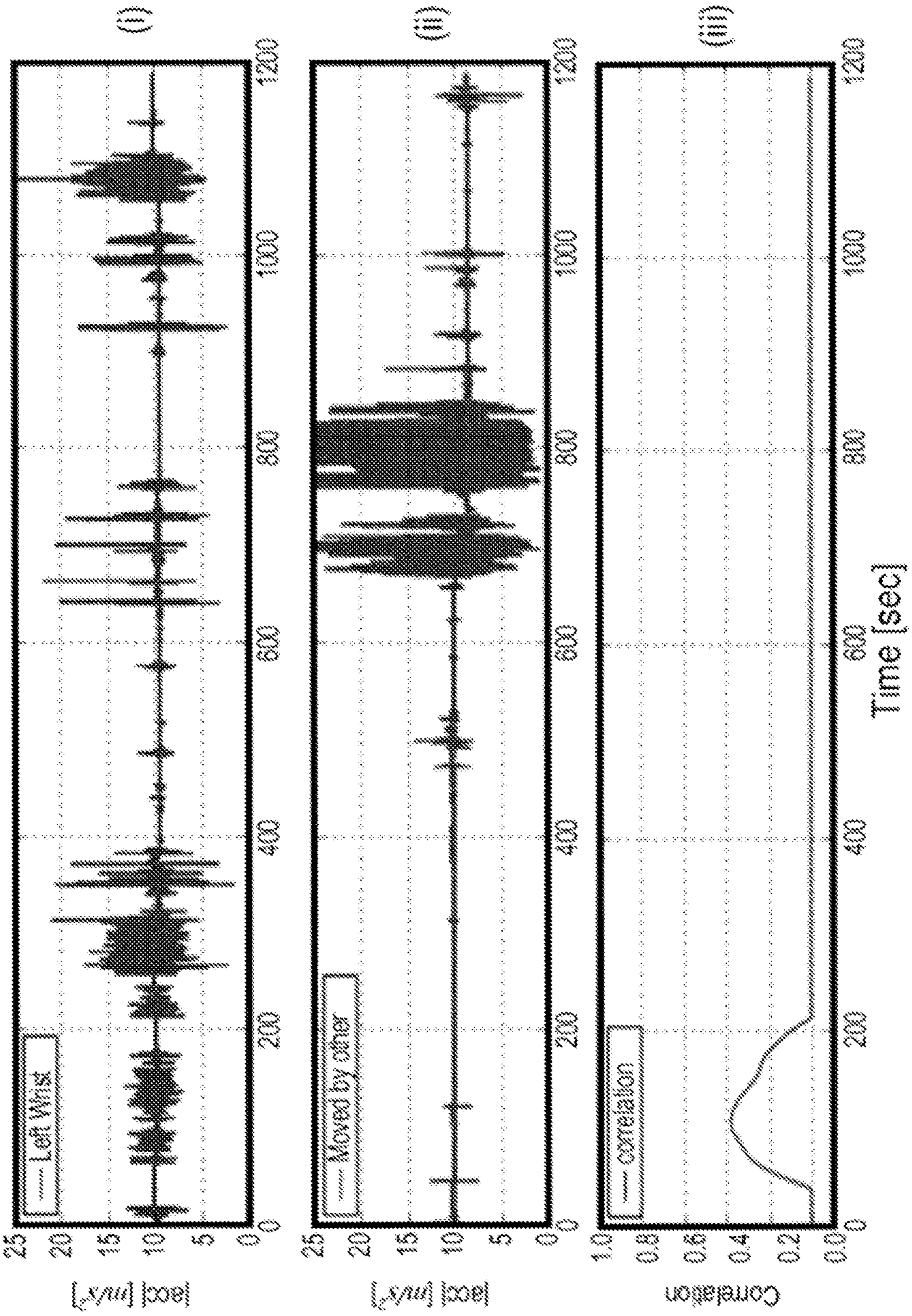
FIG. 5 shows a third set of graphs illustrating exemplary movement measurements for a fall detection apparatus, exemplary movement measurements for an object and a measure of the correlation between the movement measurements.

An embodiment of step 103 in which movements of the user/fall detection apparatus 2 are compared to movements of an object 6 to determine if the object 6 is being carried or used by the user is described in more detail with reference to FIGS. 3, 4 and 5. FIGS. 3(*i*), 4(*i*) and 5(*i*) each show an exemplary measurement signal that is the norm of a set of three dimensional acceleration measurements for a time period of 1200 seconds obtained from an accelerometer 14 in a fall detection apparatus 2 that is being worn on the left wrist of the user. FIGS. 3(*ii*), 4(*ii*) and 5(*ii*) each show a measurement signal that is the norm of a set of three dimensional acceleration measurements for the same time period obtained from an accelerometer 16 in different objects 6 (or the same object 6 but in different states of motion). In FIG. 3(*ii*), the object 6 is being carried in the front left pocket of trousers of the user, in FIG. 4(*ii*), the object 6 is not being carried or used by the user or any other person (and so the normed acceleration measurements just indicate the norm of acceleration due to gravity, i.e. 9.81 ms' (with measurement noise by the sensor 16), and in FIG. 5(*ii*), the object 6 is being carried or used by a different person to the user wearing or carrying the fall detection apparatus 2. FIGS. 3(*iii*), 4(*iii*) and 5(*iii*) show a respective correlation signal derived from the two normed acceleration signals in each Figure. Briefly, it can be seen that the movements of the fall detection apparatus 2 and the object 6 exhibit relatively high correlation in FIG. 3(*iii*) (i.e. correlation above 0.5) where the object 6 is in the user's pocket, and is thus subject to largely the same movement patterns. The measurements exhibit much lower correlation in FIG. 4(*iii*) (i.e. correlation below 0.5) where the object 6 is not moving. Finally, the measurements again exhibit low correlation in FIG. 5(*iii*) (i.e. correlation below 0.5) where the object 6 is being moved by a different person to the one wearing or carrying the fall detection apparatus 2.

Thus, in some embodiments, to test whether an object 6 is being carried or used by a user that is also wearing or carrying a fall detection apparatus 2, a correlation between the movement measurements of the fall detection apparatus 2 and the object 6 is determined. In some embodiments, where the measurements are measurements of acceleration, the norm of the acceleration measurements for each of the fall detection apparatus 2 and the object 6 can be determined. This norm can be seen as a measure of the activity of the user.

In a first step, the acceleration norm signals can be low-pass filtered (LPF), for example using a moving average filter with a half-window size of 20 seconds (although those skilled in the art will appreciate that other half-window sizes can be used).

In a second step, the LPF signals can be correlated, for example using a sliding window with half size of 80 seconds (although again those skilled in the art will appreciate that other half-window sizes can be used). The correlation at a certain time instant (sample) k is given by:

$$cc[k]=\mathrm{sum}((so[ko{:}ki]-mno)*(si[ko{:}lcd-mni))/\mathrm{sqrt}(var(so)*var(si))$$

where so[ko:ki] indicates the sample sequence from ko to ki of the signal (LPF of the norm of the acceleration) of the fall detection apparatus 2, si likewise for the object 6, ko to kJ_span the (2*80 sec) window, centred around current sample k, i.e.:

$$ko=k-80\text{ sec}$$

$$ki=k+80\text{ sec}$$

mno and mni represent the mean over that span of signal so and si, respectively, var indicates the variance, and sqrt the square root operator.

In a third step, the obtained series of cc (correlation) values are preferably smoothed (e.g. using another low pass filter), for example using a half window of 60 seconds (although again those skilled in the art will appreciate that other half-window sizes can be used). Preferably, negative values are clipped to 0. In this way, the correlation, cc, ranges between 0 and 1. The cc values can then be tested (compared) against a threshold, for example 0.5, although other values can be used if desired. Correlation values above the threshold indicate the object 6 is carried with the user/fall detection apparatus 2, and correlation values below the threshold indicate that it is not.

In some embodiments, step 103 can make use of air pressure measurements at the user and the object(s) 6 to determine if any object 6 is in use or being carried by the user. Thus, the method can also comprise receiving measurements of air pressure over time from an air pressure sensor that is worn or carried by the user, receive respective measurements of air pressure over time from respective air pressure sensors that are monitoring the air pressure at the one or more objects 6, and determining if there is a correlation between the measurements of air pressure at the user with the respective measurements of the air pressure at the one or more objects 6. The presence or absence of a correlation between the air pressure measurements at the user and the air pressure measurements at a particular object 6 is then used to determine if that particular object 6 is being carried or used by the user.

In some embodiments, step 105 may also comprise determining if or checking whether a detected fall is due to an exceptional situation, for example, due to the dropping of an object that is being carried or used by the user. This can comprise determining from the respective measurements of the movements of each of the objects in use or carried by the subject whether there is a height increase following an impact. More particularly, the dropping of an object 6 can be identified by determining whether there is a height increase following an impact in the object movement measurements, and a corresponding height increase in the user movement measurements.

If in step 105 a fall is detected, then the method can further comprise issuing or triggering an alarm or alert that the user has fallen. This alarm or alert can include an audible alarm to summon help from someone near to the user, and/or the alarm or alert can include placing a call or sending an alert signal to another person, such as a family member or care provider.

There is therefore provided a fall detection apparatus and a corresponding method that provides an improved false alarm rate (i.e. reduced occurrences of false alarms) while maintaining, or even improving, the probability of successfully detecting a fall.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A computer-implemented method that when executed on data processing hardware causes the data processing hardware to perform operations comprising:

receiving, from a first movement sensor of a first device associated with a user, first measurements of movement of the user measured by the first movement sensor over time;

receiving, from a second movement sensor of a second device associated with the user, second measurements of movement of the user measured by the second movement sensor, wherein the second device is separate from the first device;

weighting the received second measurements of movement;

processing the received first measurements of movement and the weighted received second measurements of movement to determine whether a fall by the user is detected; and in response to detecting the fall by the user, triggering an alarm or alert indicating that the user has fallen.

2. The computer-implemented method of claim 1, wherein the first device is worn by the user while receiving the first measurements of movement of the user from the first movement sensor and receiving the second measurements of movement of the user from the second movement sensor.

3. The computer-implemented method of claim 1, wherein the first device comprises a pendant or a smart watch.

4. The computer-implemented method of claim 1, wherein the first device and the second device are in communication with one another via respective interface circuitry.

5. The computer-implemented method of claim 1, wherein the data processing hardware resides on one of the first device or the second device.

6. The computer-implemented method of claim 1, wherein the operations further comprise, prior to processing the received first measurements of movement and the received second measurements of movement, determining that the user is carrying the second device.

7. The computer-implemented method of claim 6, wherein determining that the user is carrying the second device is based on comparing the received first measurements of movement to the received second measurements of movement.

8. The computer-implemented method of claim 1, wherein the operations further comprise, prior to processing the weighted received first measurements of movement and the received second measurements of movement, determining that the second device is in use.

9. The computer-implemented method of claim 8, wherein the operations further comprise:

receiving an indication that the second device is switched-on or activated, wherein determining that the second device is in use is based on the received indication that the second device is switched-on or activated.

10. The computer-implemented method of claim 1, wherein processing the received first measurements of movement and the weighted received second measurements of movement to determine whether a fall by the user is detected comprises:

processing the received first measurements of movement to determine a first indication of whether the user has fallen;

processing the weighted received second measurements of movement to determine a second indication of whether the user has fallen; and detecting that the user has fallen based on the first indication and the second indication.

11. A system comprising:

data processing hardware; and memory hardware in communication with the data processing hardware and storing instructions that when executed on the data processing hardware causes the data processing hardware to perform operations comprising:

receiving, from a first movement sensor of a first device associated with a user, first measurements of movement of the user measured by the first movement sensor over time;

receiving, from a second movement sensor of a second device associated with the user, second measurements of movement of the user measured by the second movement sensor, wherein the second device is separate from the first device;

weighting the received second measurements of movement;

processing the received first measurements of movement and the received second measurements of movement to determine whether a fall by the user is detected; and in response to detecting the fall by the user, triggering an alarm or alert indicating that the user has fallen.

12. The system of claim 11, wherein the first device is worn by the user while receiving the first measurements of movement of the user from the first movement sensor and receiving the second measurements of movement of the user from the second movement sensor.

13. The system of claim 11, wherein the first device comprises a pendant or a smart watch.

14. The system of claim 11, wherein the first device and the second device are in communication with one another via respective interface circuitry.

15. The system of claim 11, wherein the data processing hardware resides on one of the first device or the second device.

16. The system of claim 11, wherein the operations further comprise, prior to processing the received first measurements of movement and the received second measurements of movement, determining that the user is carrying the second device.

17. The system of claim 16, wherein determining that the user is carrying the second device is based on comparing the received first measurements of movement to the received second measurements of movement.

18. The system of claim 11, wherein the operations further comprise, prior to processing the received first measurements of movement and the weighted received second measurements of movement, determining that the second device is in use.

19. The system of claim 18, wherein the operations further comprise:

receiving an indication that the second device is switched-on or activated, wherein determining that the second device is in use is based on the received indication that the second device is switched-on or activated.

20. The system of claim 11, wherein processing the received first measurements of movement and the weighted received second measurements of movement to determine whether a fall by the user is detected comprises:

processing the received first measurements of movement to determine a first indication of whether the user has fallen;

processing the weighted received second measurements of movement to determine a second indication of whether the user has fallen; and detecting that the user has fallen based on the first indication and the second indication.

* * * * *